United States Patent [19]

Aoki et al.

[11] Patent Number: 4,680,208
[45] Date of Patent: Jul. 14, 1987

[54] BIAXIALLY ORIENTED PLASTIC CONTAINER WITH EXCELLENT HEAT-RESISTANCE AND GAS BARRIER PROPERTIES

[75] Inventors: Daiichi Aoki; Yoshinori Nakamura; Hiroyuki Orimoto; Kazumi Machida, all of Sakakimachi, Japan

[73] Assignee: Nissei ASB Machine Co., Ltd., Japan

[21] Appl. No.: 706,474

[22] Filed: Feb. 28, 1985

[30] Foreign Application Priority Data

Mar. 2, 1984 [JP] Japan .................................. 59-40071

[51] Int. Cl.$^4$ ......................... B27N 5/02; B65D 23/00
[52] U.S. Cl. ...................................... 428/35; 215/1 C
[58] Field of Search .......................... 428/35; 215/1 C

[56] References Cited

U.S. PATENT DOCUMENTS 4,079,850  3/1978  Suzuki et al. ...................... 215/1 C
4,497,856  2/1985  Iwasawa et al. ...................... 428/35

FOREIGN PATENT DOCUMENTS 2433725  2/1975  Fed. Rep. of Germany .

*Primary Examiner*—John E. Kittle
*Assistant Examiner*—Patrick J. Ryan
*Attorney, Agent, or Firm*—Ostrolenk, Faber, Gerb & Soffen

[57] ABSTRACT

A biaxially oriented plastic container having, in section, three layers formed by concentrically injecting two types of plastic into a cavity to mold a bottomed parison and stretch-blow molding said parison to form a biaxially oriented container with excellent heat-resistance and gas barrier properties; said two types of plastic having between them an intermediate layer of plastic having selected lengths of glass fiber.

2 Claims, 1 Drawing Figure

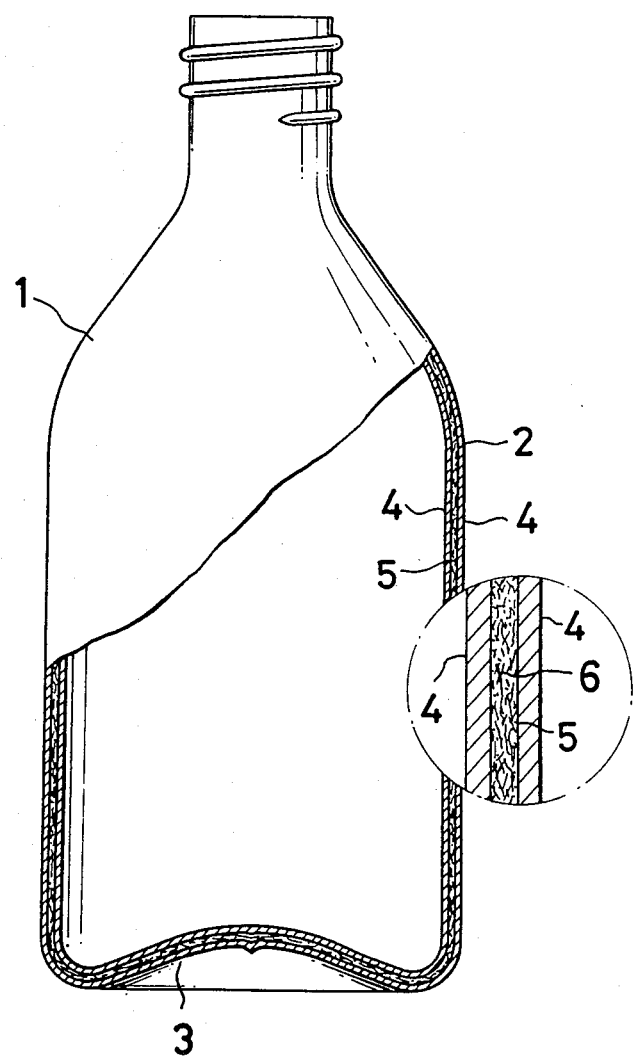

BIAXIALLY ORIENTED PLASTIC CONTAINER WITH EXCELLENT HEAT-RESISTANCE AND GAS BARRIER PROPERTIES

BACKGROUND OF THE INVENTION

1. Field of the Invention

This invention relates to a biaxially oriented container such as a bottle wherein two kinds of plastics are concentrically injected into a cavity to form a parison, and the parison is stretch-blow molded to obtain a section in the form of a three-layer, which is excellent in heat-resistance and gas barrier properties.

2. Prior Art

Plastics used for biaxially oriented containers include plastics, which have the gas barrier properties but are poor in heat-resistance, such as polyethylene terephthalate, vinyl chloride and vinylidene chloride, and plastics which have the heat-resistance but are poor in gas barrier properties, such as polycarbonate, polystyrene and polypropylene.

In bottles for carbonated drinks and the like, both pressure-resistance and gas barrier properties are regarded as important but for container for accommodating contents require heating when or after the container is filled, it is said that they should have the heat-resistance in addition to the gas barrier properties.

Accordingly, the plastics such as polycarbonate having the heat-resistance are poor in gas barrier properties, and therefore, they are difficult to be used for the packing containers. The polyethylene terephthalate which has the gas barrier properties and can withstand a filling temperature by heat treatment is widely used not only as containers for carbonated drinks but as packing containers for contents which require heating and filling.

However, since there is a limit in gas barrier properties and heat-resistance of polyethylene terephthalate, a means is merely left in which plastics accepted as a container material and plastics having the gas barrier properties or heat-resistance may be formed into a composite in order to obtain a packing container with excellent performances.

The plastics as a container may be formed into a composite by making a sectional composition of wall portions of the container a two-layer or a three-layer. However, in either case, both the gas barrier properties and heat-resistance are not yet enhanced by one layer.

SUMMARY OF THE INVENTION

This invention has been achieved in view of the above-described circumstances. An object of the invention is to provide a biaxially oriented thin-wallthickness container in which gas barrier properties and heat-resistance which are still insufficient are improved by the provision of an intermediate layer inside plastics which form a container.

It is a further object of the present invention to provide a biaxially oriented container which comprises an intermediate layer made of an inorganic material which is itself excellent in heat-resistance as compared with any other thermoplastics and even has gas barrier properties.

A biaxially oriented container according to the present invention having the above-described objects is a container which has three sections, wherein a plastic which forms a container and an inorganic material which forms an intermediate layer are concentrically injected into a cavity to form a parison which composition of wall portions has three layers, and said parison is stretch-blow molded, the resultant container being provided with the gas barrier properties and heat-resistance by the provision of said intermediate layer.

For the above-described inorganic material, glass fiber is used. The length of the glass fiber is preferably in the range of 1 to 4 mm, and said glass fiber is used while being mixed with plastics having the gas barrier properties for the purpose of improving the fluidity at the time of injection and the gas barrier properties.

The above-described plastics havig the gas barrier properties include saponified ethylene-vinylacetate copolymer, ethylene-vinylalcohol copolymer, m-xylene-type polyamide, and polyethylene terephthalate, and the glass fiber in the ratio of 0.5–3.0 weight % is added these plastics.

Plastics for forming a container include polyethylene terephthalate, vinyl chloride, polystyrene, polypropylene, and polycarbonate, which are accepted as materials for containers, these material being acceptable as far as stretch-blow molding is possible to make.

The molding conditions of parisons required to obtain a biaxially oriented container according to this invention are determined by the molding conditions of plastics of which a container is formed. Even in the case where the glass fiber as the intermediate layer is simultaneously injected into the cavity, molding without major difference from the case of a single layer may be carried out without occurrence of bubbles as far as the glass fiber is sufficiently mixed with plastics for forming the intermediate layer along with the glass fiber and the same is charged with high back pressure.

Furthermore, even in stretch-blow molding of parisons, it is possible to obtain a biaxially oriented container having an intermediate layer without constituting an obstacle to axial stretching and radial expansion due to air pressure if the amount of glass fiber is in the range of 0.5–3.0 weight %.

BRIEF DESCRIPTION OF THE DRAWING

The single drawing is a partially enlarged longitudinal sectional view of a biaxially oriented container with excellent heat-resistance and gas barrier properties in accordance with this invention.

DETAILED DESCRIPTION OF THE INVENTION

Referring to the FIGURE, the bottle 1 has a side wall 2 and a bottom wall 3 which are molded into a three-layer unit as seen in the lower portion of the FIGURE. The inner and outer layers 4 of the bottle 1 are formed from stretch-blow moldable thermoplastic resin. There is an intermediate layer 5.

The intermediate layer 5 comprises a material in which a glass fiber 6 is mixed into thermoplastic resin having gas barrier properties. Heat-resistance is imparted to the bottle 1 by the glass fiber 6. In this case, when the amount of glass fiber in the plastics exceeds 3.0 weight %, stretch-blow molding of the injection-molded bottomed parison becomes difficult, and if the content thereof is small in amount, a good result is not obtained.

The above-described bottle 1 may be very easily molded by already known means. This molding comprises positioning plastic of the intermediate layer 5 with glass fiber mixed therewith in the center of resin for forming the inner and outer layers 4, injecting both materials into the cavity in a concentric fashion, and molding a bottomed parison which has three layers in section.

The thickness of the intermediate layer within said parison varies with the object of use of bottles molded, and the percentage between the inner and outer layers and the intermediate layer can be controlled at will by the injection quantity.

The aforesaid bottle 1 may be easily molded by axially stretching the parison by conventional means and expanding it by air pressure.

In the bottle 1 with glass fiber molded in the aforementioned process, the glass fiber is not exposed to the surface of the bottle 1 in the state it is contained inside, and therefore the external appearance as a bottle is not impaired and the shock strength in the bottom wall 3 of the bottle 1 increases, and therefore, it is possible to simplify the construction of the bottom as compared with a conventional bottle molded as a self-support bottle.

Next, examples and a comparative examples are described.

EXAMPLE 1

Inner and outer layers: Polyethylene terephthalate
Intermediate layer: saponified ethylene-vinylacetate copolymer 2 weight % of glass fiber (length; 3 mm).
Wall-thicknesses (mm): Outer layer—0.12, intermediate layer—0.15, and inner layer—0.14.

EXAMPLE 2

Inner and outer layers: Polyethylene terephthalate
Intermediate layer: Polyethylene terephthalate 2.5 weight % of glass fiber (length: 3 mm).
Wall-thicknesses (mm): Outer layer—0.15, intermediate layer—0.16, and inner layer—0.11.

COMPARATIVE EXAMPLE

Degree of shrinkage of 90° C. hot water (%)
Example 1: 3.4–3.6
Example 2: 3.2–3.4
*PET (single layer) 25–30

*The bottle of PET (polyethylene terephthalate) is so deformed that the external appearance is disappeared but those in Examples 1 and 2 show no variation in external appearance. In addition, the gas barrier properties are also enhanced as compared with the case of the single layer.

What is claimed is:

1. In a biaxially oriented container having three layers in section obtained by concentrically injecting two kinds of plastics into a cavity to mold a bottomed parison and stretch-blow molding said parison to form said biaxially oriented container with excellent heat-resistance and gas barrier properties, an intermediate layer of said container being formed of plastic containing selected lengths of glass fiber; said glass fiber having a length of 1–4 mm and being present in a percentage of 0.5–3.0 percent by weight with respect to said plastic which forms said intermediate layer, said plastic material of said intermediate layer being selected from the group consisting of polyethylene terephthalate, saponified ethylene-vinylacetate copolymer, ethylene-vinylalcohol copolymer, and m-xylene-type polyamide.

2. A biaxially oriented container with excellent heat-resistance and gas barrier properties as defined in claim 1 in which the plastic for forming said intermediate layer comprises plastic with excellent gas barrier properties.

* * * * *